United States Patent [19]

Borman

[11] 4,033,927

[45] July 5, 1977

[54] FLAME RETARDANT POLYESTER RESIN COMPOSITIONS

[75] Inventor: Willem F. H. Borman, Pittsfield, Mass.

[73] Assignee: General Electric Company, Pittsfield, Mass.

[22] Filed: Jan. 15, 1975

[21] Appl. No.: 541,344

Related U.S. Application Data

[63] Continuation of Ser. No. 194,519, Nov. 1, 1971, abandoned.

[52] U.S. Cl. .......................... 260/45.7 P; 260/2 P; 260/860; 260/DIG. 24
[51] Int. Cl.$^2$ ......................................... C08K 5/53
[58] Field of Search ............... 260/45.7 P, 860, 2 P

[56] References Cited

UNITED STATES PATENTS

| | | | |
|---|---|---|---|
| 2,891,915 | 6/1959 | McCormack et al. | 260/2 |
| 2,926,145 | 2/1960 | McConnell et al. | 260/2 |
| 2,964,477 | 12/1960 | Pilat et al. | 252/49.8 |
| 3,547,878 | 12/1970 | Savides | 260/45.8 |
| 3,640,949 | 2/1972 | Dalzell | 260/45.75 |
| 3,671,487 | 6/1972 | Abolins | 260/40 |
| 3,719,727 | 3/1973 | Masai et al. | 260/860 |
| 3,830,771 | 8/1974 | Cohen et al. | 260/40 |
| 3,925,303 | 12/1975 | Rio et al. | 260/45.7 |
| 3,927,231 | 12/1975 | Desitter et al. | 260/2 |
| 3,928,283 | 12/1975 | Masai et al. | 260/45.7 |

OTHER PUBLICATIONS

Rose et al., "The Condenser Chemical Dictionary", 7th edition, 1966, p. 657.

*Primary Examiner*—Donald E. Czaja
*Assistant Examiner*—R. A. White
*Attorney, Agent, or Firm*—William F. Mufatti; Edward A. Hedman; James V. Costigan

[57] ABSTRACT

Flame retardant thermoplastic molding compositions are provided comprising a normally flammable linear polyester and a pentavalent phosphorus-containing flame retardant agent. Particularly efficient phosphorus-containing agents are brominated arylphosphates, polyalkylenearyl phosphonates and triarylphosphine oxides.

1 Claim, No Drawings

FLAME RETARDANT POLYESTER RESIN COMPOSITIONS

This is a continuation of application Ser. No. 194,519, filed Nov. 1, 1971, now abandoned.

This invention relates to flame retardant thermoplastic polyester compositions. More particularly, it pertains to self-extinguishing and non-burning compositions comprising a normally flammable linear high molecular weight polyester and a phosphorus-containing flame retardant additive. The compositions are superior to known polyester compositions because they are flame retardant at phosphorus levels of as low as 1% of less by weight and because the additives are chemically inert, thermally stable and of low volatility.

BACKGROUND OF THE INVENTION

High molecular weight linear polyesters and copolyesters of glycols and terephthalic or isophthalic acid have been available for a number of years. These are described inter alia in Whinfield et al, U.S. Pat. No. 2,465,319 and in Pengilly, U.S. Pat. No. 3,047,539. These patents disclose that the polyesters are particularly advantageous as film and fiber-formers.

Such polyesters have not been widely accepted for use as molding resins, however, until only fairly recently, because of their relative brittleness in thick sections when crystallized from the melt. This problem was overcome by varying the crystal texture, e.g., by using two step molding cycles or including nucleating agents, and by molecular weight control. This permitted the marketing of injection moldable poly(ethylene terephthalates) which typically, in comparison with other thermoplastics, offer a high degree of surface hardness and abrasion resistance, and lower surface friction. High homologs of poly(ethylene terephthalate), e.g., poly(1,3-propylene terephthalate) and poly(1,4-butylene terephthalate) crystallize more rapidly from the melt and may, therefore, by used without two step cycles or nucleating agents, directly in molding compositions.

However, although the thermoplastic polyesters are very useful materials, their application has been severly hindered by the fact that they burn readily and are extremely difficult to render fire retardant.

It has been proposed to incorporate conventional flame retardant compounds, e.g., halogenated or phosphorus-containing organic compounds, with or without synergists, e.g., antimony compounds, non-conventional compounds, e.g., tetrabromophthalic anhydride, to render polyester compositions flame retardant, but these are not generally satisfactory to meet the more rigid requirements, e.g., those of the Underwriters' Laboratories specifications. Moreover, some degradation of the polyester component is seen; the burning material drips and can ignite combustible materials beneath it; and after-glow remains as a substantial problem.

Three main factors apparently are responsible for the unusual difficulty in rendering polyester compositions fire retardant — in comparison with other thermoplastics, for example. These factors are:

a. conventional flame retardant additives, e.g., halogenated compounds, phosphorus compounds and antimony compounds, do not appear to be very effective when used with polyesters because the polyesters contain a relatively high oxygen content:

b. polyesters have a tendency to drip while burning, and it is difficult to prevent the dripping; and c. polyesters are subject to serious degradation in the presence of a number of conventionally used flame retardants, with a loss in physical properties.

After evaluating many materials, it has now been found that certain phosphorus compounds are very specifically efficient in providing flame retardancy. Many of them are active at very low phosphorus levels, e.g., 1% or less by weight. Surprisingly, other, quite similar, phosphorus compounds have little or no effect on normal flammability of polyesters.

It has been discovered, for example, that brominated aryl phosphates, e.g., tris(4-bromophenyl)phosphate, are very active flame retardants for poly(alkylene iso- and terephthalates) at concentrations of, e.g., 10 parts by weight per hundred parts by weight of polyester, providing a rating of SE-O in the very stringent Underwriters' Laboratories UL-94 test. Surprisingly, these results are obtained in the absence of synergists, with only 0.5% by weight of phosphorus, and with only 3.9% by weight of bromine in the composition. Unexpectedly, the corresponding chlorinated aryl phosphates, e.g., tris(4-chlorophenyl)phosphate, have a very low flame retardant activity, showing the surprising specificity of bromine in one aspect of the present compositions.

It has also been discovered that partially aromatic phosphonates, e.g., poly(1,4-cyclohexylene dimethylene)phenyl phosphonate, poly(1,4-phenylene)phenyl phosphonate and poly(4,4'-isopropylidene diphenylene)phenyl phosphonate, are very active flame retardants for poly(alkylene iso- and terephthalates) at concentrations of, e.g., 10 parts by weight per hundred parts by weight, providing an Oxygen Index of 29 – 30% in the test according to ASTM-D 2863. Surprisingly, these results are obtained in the absence of halogen or synergists, and with only 0.8-1.2% by weight of phosphorus in the composition. Unexpectedly, the corresponding, almost identical, aromatic phosphates, give an Oxygen Index of only about 24.0% maximum which is only slightly improved over that of the normally flammable polyester resin itself.

As further illustrations of the highly specific activity of the flame retardant additives discovered to be useful, it has been found that aliphatic phosphonates are much less effective; di(arylalkyl)arylalkyl phosphonates which do not contain an aryl-phosphorus bond are efficient flame retardants, but are unstable and degrade the polyester; hydrogen phosphonates are much less effective as flame retardant agents and degrade the polyester; and alkylphenylphosphinates, which contain an alkyl-phosphorus bond — not interrupted by oxygen — are unstable and degrade the polyester. Trivalent phosphorus compounds, including phosphites, phosphonites and phosphines are also much less effective than the present pentavalent phosphorus containing compounds.

It has been found that any tendency to drip, while burning, can be overcome by adding to the compositions a small amount of a polytetrafluoroethylene resin or a fumed colloidal silica.

In addition, if the materials are compounded carefully, having due regard to the sensitive nature of the polyester, and attention is paid to careful drying of the resin and all other ingredients prior to compounding, there will be little or no degradation in physical properties, exemplified, for example, by a decrease in the apparent molecular weight, i.e., loss in intrinsic viscosity.

DESCRIPTION OF THE INVENTION

The above-mentioned advantages are secured according to this invention by providing flame retardant thermoplastic compositions, useful, e.g., for injection molding, compression molding, transfer molding extrusion, film formation, and the like, comprising a. a normally flammable high molecular weight linear polyester resin and b. a phosphorus-containing flame-retardant additive in a minor proportion based on the composition but in an amount at least sufficient to render the polyester resin flame retardant, the additive having the formula:

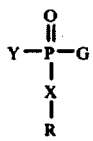

wherein X is —O— or a carbon-to-phosphorus bond and, and, i. when X is —O—, R is a brominated aryl group and Y and G are brominated oxyaryl groups; and, ii. when X is a carbon-to-phosphorus bond, R is aryl; Y is aryl, oxyalkyl, oxycycloalkyl or oxyaryl; and G is aryl, oxyaryl or a single or repeating unit of the formula

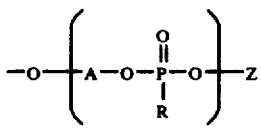

wherein R is aryl, A is a divalent alkylene, cycloalkylene, arylene or polyarylene radical, which may be interrupted by alkylidene, oxygen-, nitrogen-, sulfur-, and phosphorus-containing groups; and Z is a terminal group which may be, e.g., hydrogen alkyl, cycloalkyl or aryl; and, when taken together, G and Y are divalent dioxyalkylene, dioxycycloalkylene or dioxyarylene groups.

When used herein, the terms "non-burning", "self-extinguishing" and "non-dripping" are used to describe composites which meet the standards of ASTM test method D-635 and underwriters' Laboratories Bulletin No. 94. In this test, a molded piece 5 by ½ by 1/16 inch is formed from the composition and if after each of two 10-second ignitions the sample will extinguish itself within an average of 25 seconds and within a maximum of 30 seconds — and if any dripping portions do not ignite a piece of cotton 12 inches beneath — the composition is deemd to be Self Extinguishing, Class 1 by the Underwriters' Laboratores. ASTM test D-635 for flammability comprises contacting the end of a specimen one-half inch by 5 inches and "thickness normally supplied" with a Bunsen burner flame for 30 seconds; and repeating if there is no ignition. If the specimen does ignite but does not continue burning to the 4 inch mark, after the flame is removed, it is classed as "self-extinguishing by this test."

In general, for convenience, the term "flame retardant" is used in the sense that the resistance to combustibility of the composition is significantly increased in comparison with control samples. A suitable direct measure of combustibility is the Oxygen Index Test. This test is a direct measure of a product's combustibility based on the oxygen content of the combustion atmosphere. Appropriate specimens are placed in a combustion chimney and the oxygen is reduced stepwise until the material no longer supports a flame. The Oxygen Index is defined as the percent oxygen times 100 divided by the sum of the percentages of nitrogen and oxygen in the gas used to burn the material under test. Further details of the Oxygen Index test are found in ASTM test method D-2863. The compositions of this invention which contain flame-retardant additives of the specified types in the specified amounts have a substantially higher oxygen index and thus are much less combustible than the controls.

The high molecular weight, normally flammable, linear polyesters used in the present compositions are polymeric glycol esters of terephthalic acid and isophthalic acids, and, if desired, minor amounts (up to 15% by weight) of difunctional aliphatic acids. They are available commerically or can be prepared by known techniques, such as by the alcoholysis of esters of the corresponding phthalic aicd with a glycol and subsequent polymerization, by heating glycols with the corresponding free acids or with halide derivatives thereof, and similar processes. These are described in U.S. Pat. Nos. 2,465,319 and U.S. 3,047,539, and elsewhere.

Although the glycol portion of the polyester can contain from 2 to 10 carbon atoms, it is preferred that it contain from 2 to 4 carbon atoms, in the form of linear methylene chains.

Preferred polyesters will be of the family consisting of high molecular weight, polymeric glycol terephthalates or isophthalates having repeating units of the general formula

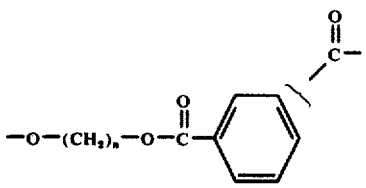

wherein n is a whole number of from 2 to 4 and mixtures of such esters, including copolyesters of terephthalic and up to about 35 mole % of isophthalic acid and, if desired, up to about 15% of an aliphatic diacid.

Especially preferred polyesters are poly(ethylene terephthalate) and poly(1,4-butylene terephthalate). Special mention is made of the latter because it crystallizes at such a good rate that it may be used for injection molding without the need for nucleating agents or long cycles, as is sometimes necessary with poly(ethylene terephthalate).

Illustratively, high molecular weight polyesters will have an intrinsic viscosity of at least about 0.4 deciliters/gram as measured in o-chlorophenol, a 60/40 phenol-tetrachloroethane mixture or a similar solvent at 25°-30° C.

The phosphorus-containing flame-retardant additives useful in this invention comprise a family of chemical compounds of the general formula

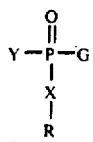

wherein X, Y, R and G are as defined hereinabove. Although they can be used in combination with other conventional flame retardant additives and with synergists, such as antimony oxide, it is preferred that they be used alone to avoid problems with polyester degradation, the tendency to liberate corrosive and toxic gases and adverse effects on physicl properties.

The amount of phosphorus-containing flame-retardant additive used is not critical to the invention, so long as it is present in a minor proportion based on said composition — major proportions will detract from physical properties — but at least sufficient to render the polyester resin flame retardant, non-burning or self-extinguishing. Those skilled in the art are well aware that the amount will vary with the nature of the resin and with the efficiency of the additive. In general, however, the amount of additive will be from 0.5 to 50 parts by weight per hundred parts of resin. A preferred range will be from about 3 to 25 parts and an especially preferred range will be from about 5 to 15 parts of additive per 100 parts of resin. In general, smaller amounts of compounds highly concentrated in bromine and/or phosphorus, i.e., the elements responsible for flame-retardance, will be used. If synergists, e.g., antimony oxide, are used, they will be employed at about 2 to 5 parts by weight per 100 parts of resin.

Among the particularly useful brominated aryl phosphonate compounds are those of the formula

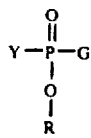

wherein R is selected from

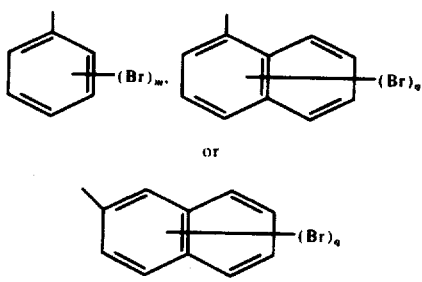

or and G and Y are selected from

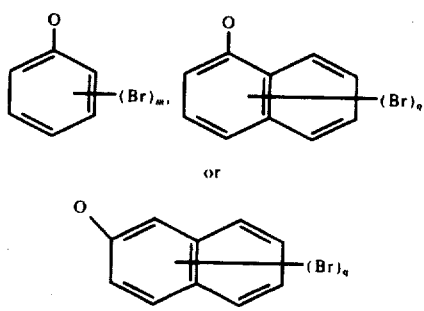

or wherein $m$ is an integer of from 1 to 5 and $q$ is an integer of from 1 to 7.

Illustrative brominated aromatic phosphates embraced by the above formula are, tris(2-bromophenyl)-phosphate; tris(3-bromophenyl)phosphate; tris(4-bromophenyl)phosphate; tris(2,4-dibromophenyl)-phosphate; tris(2,6-dibromophenyl)phosphate; tris(3,4-dibromophenyl phosphate); tris(3,5-dibromophenyl)phosphate; tirs(2,4,6-tribromophenyl)phosphate; tris(1,3,6-tribromo-2-naphthyl)phosphate, tris(2,3,4-tribromo-1-naphthyl)phosphate; as well as mixed such compounds, such as di(4-bromophenyl)-3,4-dibromophenyl phosphate, and the like.

The brominated aromatic phosphates used in this invention can be made by techniques well-known to those skilled in the art. For example, a brominated-phenol or -naphthol can be reacted with phosphorus oxychloride according to the following:

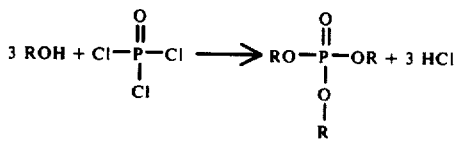

wherein R is bromoaryl or polybromoaryl, as above defined. High yields are obtained if the reaction is carried out in a two phase aqueous-organic interfacial reaction in the presence of caustic. A suitable procedure will be illustrated hereinafter.

Among the particularly useful aryl phosphonate compounds are those of the formula

wherein R is mono- or di-carbocyclic aryl of from 6 to 12 carbon atoms, e.g., phenyl, 2-methylphenyl, 2,6-dimethylphenyl, 2,4,6-trimethylphenyl, 4-ethylphenyl, α-naphthyl, β-naphthyl, 3-methyl-α-naphthyl, 2-methyl-α-naphthyl, 2,3-dimethyl-α-naphthyl, and the like;

Y is aryl, oxyalkyl, oxycycloalkyl or oxyaryl of from 1 to 30 carbon atoms;

G is aryl, oxyaryl or a singular divalent unit or a repeating unit (average 2–50) of the formula

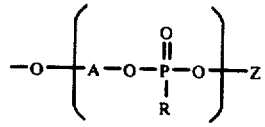

wherein R is mono- or di-carbocyclic aryl as illustrated hereinbove; Z is hydrogen, alkyl, cycloalkyl or aryl; and A is a divalent alkylene, alkylidene or cycloalkylidene group of from 1 to 14 carbon atoms, e.g., methylene, ethylene, propylene, isopropylene, isopropylidene, butylene, isobutylene, amylene, cyclohexylene, cyclopentylidene, cyclohexylene dimethylene, and the like; a divalent mono- or di-carbocyclic arylene group of from 6 to 12 carbon atoms, e.g., 1,2-phenylene, 1,3-phenylene; 1,4-phenylene; 1,2-naphthylene; 1,3- naphthylene; 1,4-naphthylene; 2,6-naphthylene and the like; or a polyarylene group of the formula

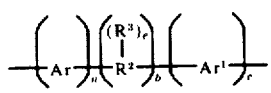

wherein R² is a divalent group, e.g., of from 1 to 18 carbon atoms, such as an alkylene, alkylidene or cycloaliphatic linkage, e.g., methylene, ethylene, propylene, isopropylene, isopropylidene, butylene, isobutylene, amylene, cyclohexylene, cyclopentylidene, cyclohexylene dimethylene and the like; a linkage selected from the group consisting of oxygen; carbonyl; amino, including substituted amino; a sulfur containing linkage, e.g., sulfide, sulfoxide, sulfone; a phosphorus-containing, e.g., a mono- or di-carbocyclic aryl or alkylaryl phosphonate linkage; and the like. R² can also consist of two or more alkylene or alkylidene linkages, e.g., of 2 to 17 carbon atoms, together, or connected by such groups as arylene, oxygen, carbonyl, amino, including substituted amino, sulfide, sulfoxide, sulfone, a phosphorus-containing linkage, and the like. Other groups which are represented by R² will be obvious to those skilled in the art.

Ar and Ar¹ are mono- or polycarbocyclic divalent arylene groups of, e.g., 6 to 12 carbon atoms, such as phenylene, bi-phenylene, naphthylene, and the like. Ar and Ar¹ may be the same or different.

R³ is a monovalent hydrocarbon group, e.g., of from 1 to 12 carbon atoms, such as methyl, ethyl, propyl, isopropyl, butyl, decyl, and the like; or an aryl group, e.g., mono- or dicarbocyclic aryl of from 6 to 12 carbon atoms, such as phenyl, naphthyl, biphenyl, xylyl, tolyl, and the like; as well as an aralkyl group, such as benzyl, ethylphenyl, and the like; a cycloaliphatic group, such as cyclopentyl, cyclohexyl, and the like; as well as monovalent hydrocarbon groups containing inert substituents therein. It will be understood that where more than one R³ group is present they may be alike or different.

The letter *e* is 0 or represents a whole number ranging from 1 to a maximum controlled by the number of replaceable hydrogens on R². The letters *a*, *b*, and *c* represent 0 or whole numbers of from 1 to 6. When *b* is a whole number, and not 0, neither *a* nor *c* may be 0. Otherwise, either *a* or *c*, but not both, may be 0. Where *b* is 0, the aromatic groups are joined by a direct carbon-to-carbon bond.

Included within the scope of the above aryl phosphonate formulae are
poly(1,4-cyclohexylene dimethylene)phenyl phosphonate,
A is

and R is phenyl;
poly(1,4-phenylene)phenyl phenyl phosphonate, A is

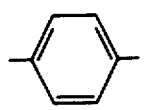

and R is phenyl;
poly(4,4'-isopropylidene diphenylene)phenyl phosphate,
A is

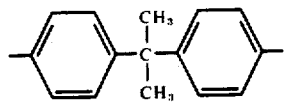

and R is phenyl;
and
neopentylenephenylphosphonate

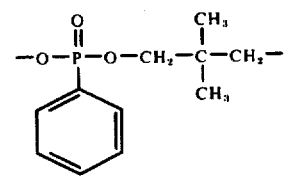

The aryl phosphonate compounds can be prepared by techniques well known to those skilled in the art. For example, a dihydroxy compound can be reacted with an aryl phosphonic dichloride according to the following

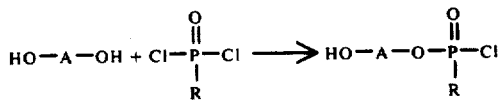

wherein A and R are as hereinabove defined. Because the ingredients are difunctional, condensation will usually proceed with the formation of repeating units, e.g.,

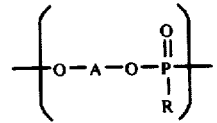

If an excess of the dihydroxy compound is used, the chains of repeating units will be terminated by hydroxy groups. If an excess of phosphonic dichloride is used, it is preferred to terminate the chains by replacing the terminal chlorine atoms by reaction with water, e.g., with hydroxyl groups or with an alcohol, e.g., with hydrocarbonoxy groups. Suitable procedures will be illustrated hereinafter. Also embraced by the above formula is triphenylphosphine oxide;

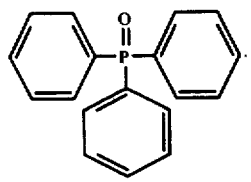

This compound is commercially available.
Among the preferred features of this invention are flame retardant compositions, as above defined, which have been rendered non-dripping by also including (c) polytetrafluoroethylene resin or a fumed colloidal silica in a minor proportion but in an amount at least sufficient to render the polyester non-dripping, while burning.

The polytetrafluoroethylene resins used as component (c) as dripping retarding agents are commercially available or can be prepared by known processes. They are white solids obtained by free radical initiated polymerization of tetrafluoroethylene in aqueous media with free radical catalysts, e.g., sodium, potassium, or ammonium peroxydisulfates at 100 to 1000 psi. at 0°–200° C. and preferably at 20°–100° C. See Brubaker, U.S. Pat. No. 2,393,967. While not essential, it is preferred to use the resins in the form of relatively large particles, e.g., of average size 0.3 to 0.7 mm., mostly 0.5 mm. These are better than the usual polytetrafluoroethylene powders which have particles of from 0.05 to 0.5 millimicrons in diameter. It is especially preferred to use the relatively large particle size material because it tends to disperse readily in polymers and bond them together into fibrous networks. Such preferred polyethylenes are designated by ASTM as Type 3, and are available commercially from the DuPont Company (TEFLON Type 6) for general use in the extrusion of thin-walled tubular goods and tape.

The amount of polytetrafluoroethylene to be used can vary widely, from an amount at least sufficient to render the polyester non-driping (when burning) but usually will be from about 0.1 to about 10 parts and preferably from 0.5 to about 2.5 parts by weight per hundred parts by weight of the components (a) plus (b).

The fumed colloidal silica employed as component (c) in the non-dripping embodiments is preferably a finely powdered form. A silica which is particularly preferred is commercially available as Cab-O-Sil-EH-5 from the Cabot Corporation. Cab-O-Sil-EH-5 is a submicroscopic fumed silica having on a dry basis 99% silicon dioxide. It has a surface area of 390 ± 40 m$^2$/gm. (BET), a nominal particle size of 0.007 micron, a maximum density of 2.3 lbs./cu. ft., an ignition loss of 2.5% (1000° C moisture free basis) and a pH of 3.5–4.2 (4% aqueous dispersion). The fumed colloidal silica may be employed at a range of 0.25 to 4 parts by weight per 100 parts by weight of components (a) plus (b). However, a particularly preferred range is 0.5 to 2.5 parts by weight. Within this particularly preferred range it has been found advantageous to employ in most compositions about 1.25 parts by weight per 100 parts by weight of components (a) plus (b).

The method of combining the polyester resin with the additive(s) is not critical. For example, the ingredients can be blended in powder, liquid or granular form, as the case may be, then the blend may be extruded, chopped into pellets and, if desired re-extruded and chopped again. On the other hand, the polyester may be melted in an inert atmosphere, e.g., under nitrogen, mixed with the additive(s) until homogeneous and either melt-cast into the desired shape, or cooled and broken up into molding granules.

For best results, it is always very important to thoroughly free all of the ingredients, polyester resin, flame retardant additive(s) and drip-retardant agent, if used, from as much water as possible.

In addition, it is to be understood that compounding should be carried out to insure that the residence time in the compounding machine is short; the temperature is carefully controlled; the frictional heat is utilized; and an intimate blend between the resin and the additives is obtained.

Although it is not essential, best results are obtained if the ingredients are precompounded, pelletized and then molded. Precompounding can be carried out in conventional equipment. For example, after carefully pre-drying the polyester resin and the additive(s), e.g., under vacuum at 100° C. for 12 hours, a single screw extruder is fed with a dry blend of the ingredients, the scrrew employed having a long transition section to insure proper melting. On the other hand, a twin screw extrusion machine, e.g., a 28 mm. Werner Pfleiderer machine can be fed wih resin and additive(s) added at the feed port of down-stream. In either case, a generally suitable machine temperature will be about 460° to 500° F.

The precompounded composition can be extruded and cut up into molding compounds, such as conventional granules, pellets, etc., by standard techniques.

The compositions can be molded in any equipment conventionally used for thermoplastic polyester compositions. For example, with poly(1,4-butylene terephthalate), good results will be obtained in an injection molding machine, e.g., of the Newbury type, with conventional cylinder temperatures, e.g., 480°–530° F. and conventional mold temperatures, e.g., 150° F. On the other hand, with poly(ethylene terephthalate), because of the lack of uniformity of crystallization from interior to exterior of thick pieces, somewhat less conventional, but still well known, techniques can be used. For example, a nucleating agent such as graphite or a metal oxide, e.g., ZnO or MgO, can be included and standard mold temperatures of 150°–200° F. will be used; or, without such agents, mold temperatures of at least 230° F. will be used. These techniques are described at length in Furukawa et al, U.S. Pat. No. 3,368,995, incorporated by reference.

The following procedures illustrate the preparation of representative flame retardant additives used in the compositions of this invention.

PROCEDURE A

Tris(4-bromophenyl)phosphate

4-Bromophenol, 43 g., is dissolved in a solution of 12 g. of NaOH in 100 ml. of water. To this solution in a nitrogen-purged high speed stirring reactor is added 0.2 g. of methyl triphenyl phosphonium bromide. The solution is stirred rapidly while 7.7 g. of POCl$_3$ dissolved in 100 ml. of methylene chloride is added in a thin stream over a 2 minute period. The reaction mixture is stirred rapidly for an additional 3 minutes and then more slowly for 10 minutes. After separating the phases, the organic layer is washed with dilute caustic, then with water until neutral, and dried over MgSO$_4$. The solvent is removed in vacuo and the resulting crude product is recrystallized once from n-heptane. The product weighs 20.4 g. (72.5% yield); white crystals, m.p., 108°–110° C.

In an analogous manner replacement of 4-bromophenol with stoichiometric quantities of 2-bromophenol; 3-bromophenol; 2,4-dibromophenol; 2,6-dibromophenol; 3,4-dibromophenol; 3,5-dibromophenol; 2,4,6-tribromophenol; and 1,3,6-tribromo-2-naphthol provides the corresponding bromo-aryl phosphates.

PROCEDURE B

Poly(1,4-Cyclohexylene dimethylene)phenyl phosphonate 1,4-Cyclohexane dimethanol, 245 g., 380 ml. of pyridine and 1000 ml. of chlorobenzene are charged to a 2-liter round bottom flask, provided with a mechanically driven stirrer, thermometer, nitrogen purge, addition funnel and a Dean Stark trap leading to a reflux condenser. The solution is heated and 50 ml. distillate is discarded. After cooling the flask in a water bath, 349 g. of phenyl phosphonic dichloride is added dropwise over a one hour period, with stirring and cooling to keep the temperature below 30° C. After addition is complete, stirring is continued another 20 minutes. At that time, 25 ml. of MeOH are added, and stirring is continued for 2 hours. The pyridine hydrochloride is filtered off and the filtrate is concentrated by distillation, removing 1100 ml. of solvent together with some residual pyridine hydrochloride. The concentrated solution is transferred to a 1000 ml. round bottom flask, attached to a rotary evaporator and the remaining solvent is removing by heating the rotating flask in a silicone oil bath at 125° C. under oil pump vacuum.

The product, poly(cyclohexylene dimethylene)phenyl phosphonate, terminated by methoxy groups, is a highly viscous, light tan oil. The yield is 437.5 g. (97% of theoretical yield, based on $C_6H_5POCl_2$).

In an analogous manner, replacement of 1,4-cyclohexane dimethanol with stoichiometric amounts of hydroquinone, bisphenol-A (4,4'-isopropylidenediphenol) and neopentyl glycol provides, respectively, poly(1,4-phenylene)phenyl phosphonate, poly(4,4'-isopropylidene diphenylene)phenyl phosphonate, and neopentylenephenyl phosphonate.

Description of the Preferred Embodiment

The following examples illustrate the invention. They are set forth as a further description, but are not to be construed as limiting the invention thereto.

The following general procedure is used to prepare melt-cast specimens for flame testing and measurement of the Oxygen Index by ASTM D-2863.

About 15 g. of thoroughly dry poly(alkylene terephthalate) and the specified amount of the selected flame retardant additive are weighed into a 25 × 200 mm. side-arm-equipped test tube. A spiral stirrer is fitted into the tube through a ball joint seal and the tube is flushed with nitrogen by evacuation and releasing the vacuum with dry nitrogen and then suspended in a hot silicone oil bath at 240°-250° C. After the polyester melts, the mixture is stirred until homogeneous (approximately 15 minutes total immersion time).

After the product is cooled to about 25° C., it is cut into small pieces and placed in a small aluminum boat-shaped dish (made by folding heavy aluminum foil around a ¼ × ½ × 5 inch bar). The specimen is placed in a tube furnace, flushed with dry nitrogen, and heated at 260° C. for about 15 minutes to melt the specimen. The melt is cooled and the resulting melt-cast bar is tested for flame resistance and combustibility.

EXAMPLE 1

The following formulations are prepared, and melt-cast or injection molded into bars and the Oxygen Indices are determined:

| Example | 1 | 1A* |
|---|---|---|
| Ingredients (parts by weight) | | |
| poly(1,4-butylene terephthalate) | 100 | 100 |
| tris(4-bromophenyl) phosphate | 10 | 10 |
| % Phosphorus in composition | 0.5 | 0.5 |
| % Bromine in compositon | 3.9 | 3.9 |
| Combustibility | | |
| Oxygen Index, % | 30.0 | 27.0 |

*1A - Specimens are injection molded, instead of melt-cast.

It is thus demonstrated that tris(4-bromophenyl)phosphate at a concentration of only 10 pph (parts per hundred), and without additional synergist, imparts a high oxygen index of 27-30% to normally flammable poly(1,4-butylene terephthalate). This high efficiency as a flame retardant agent is realized at a phosphorus content of only 0.5% and a bromine content of 3.9%, based on the weight of the composition.

Tris(4-bromophenyl)phosphate is an effective flame retardant agent even at the 5 pph level. The injection molded bars (Example 1A) in addition to having a high Oxygen Index, are self-extinguishing with a SE-O rating in a simulated Underwriters Laboratories UL 94 test.

The intrinsic viscosity of the composition of Example 1 after processing is 0.70 deciliters/gram, indicating no degradation by the additive.

The procedure is repeated, substituting for the tris(4-bromophenyl)phosphate, equal weights of the following brominated aryl phosphates: tris(2-bromophenyl)phosphate; tris(3-bromophenyl)phosphate; tris(2,4-dibromophenyl)phosphate; tris(2,6-dibromophenyl)phosphate; tris(3,4-dibromophenyl)phosphate; tris(3,5-dibromophenyl)phosphate; tris(2,4,6-tribromophenyl)phosphate; and tris(1,3,6-tribromo-2-naphthyl)phosphate. Flame retardant polyester compositions according to this invention are obtained.

EXAMPLES 2-4

The following formulations are prepared, melt-cast into bars and the Oxygen Indices are determined:

| Example | 2 | 3 | 4 |
|---|---|---|---|
| Ingredients (parts by weight) | | | |
| poly(1,4-butylene terephthalate) | 100 | 100 | 100 |
| poly(1,4-cyclohexylene dimethylene)phenyl phosphonate | 5 | 10 | 15 |
| % Phosphorus in composition | 0.55 | 1.05 | 1.50 |
| Combustibility | | | |
| Oxygen Index, % | 26-27 | 29-30* | 29 |

*range of three preparations.

The high flame retardance of this composition is shown by the Oxygen Index of 29-30% at 10 pph. It is interesting to compare this high activity with that of the almost identical poly(1,4-cyclohexylene dimethylene)phenyl phosphate

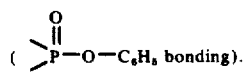

$(>\!\!\overset{O}{\underset{\|}{P}}\!\!-O-C_6H_5$ bonding).

This provides an Oxygen Index of only 24.0%.

The procedure is repeated, substituting the following aryl phosphonates for poly(1,4-cyclohexylene dimethylene)phenyl phosphonate:

$$Y-\overset{\overset{O}{\|}}{\underset{R}{P}}-O-\left[A-O-\overset{\overset{O}{\|}}{\underset{R}{P}}-O\right]-Z$$

| R | A | Y | Z |
|---|---|---|---|
| phenyl | —CH₂(CH₂)₄CH₂— | CH₃O | CH₃ |
| phenyl | —H₂C-cyclohexyl-CH₂— | O—H₂C-cyclohexyl-CH₂OH | —H₂C-cyclohexyl-CH₂OH |
| phenyl | —H₂C-cyclohexyl-CH₂— | CH₃O | CH₃ |
| naphthyl | | | |

Flame retardant compositions according to this invention are obtained.

EXAMPLE 5

The following formulation is prepared, melt-cast into bars and the Oxygen Index is determined:

| Ingredients | Parts by weight |
|---|---|
| poly(1,4-butylene terephthalate) | 100 |
| poly(1,4-phenylene)phenyl phosphonate | 10 |
| % Phosphorus in composition | 1.2 |
| Combustibility | |
| Oxygen index, % | 29.5 |

The high fire retardancy of this composition is shown by the Oxygen Index of 29.5%. The intrinsic viscosity after processing is 0.76 dl./g., demonstrating no degradation of the polyester has occurred. In contrast to this high efficiency, no flame retardance is imparted by the closely related poly(1,4-phenylene)phenyl phosphonite (containing the trivalent

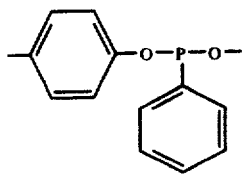

bond), which at 10 pph imparted an Oxygen Index of only 22.5%.

The procedure is repeated, substituting the following aryl phosphonates for poly(1,4-phenylene)phenyl phosphonate:

$$Y-\overset{\overset{O}{\|}}{\underset{R}{P}}-O-\left[A-O-\overset{\overset{O}{\|}}{\underset{R}{P}}-O\right]-Z$$

| R | A | Y | Z |
|---|---|---|---|
| phenyl | o-tolyl | CH₃O | CH₃ |
| phenyl | m-tolyl | CH₃O | CH₃ |
| phenyl | naphthyl | CH₃O | CH₃ |
| naphthyl | p-tolyl | CH₃O | CH₃ |

-continued

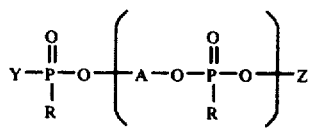

| R | A | Y | Z |
|---|---|---|---|
| 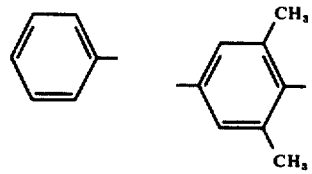 | (2,4,6-trimethylphenylene) | CH₃O | CH₃ |

Flame retardant compositions according to this invention are obtained.

EXAMPLE 6

The following formulation is prepared, melt-cast into bars and the Oxygen Index is determined:

| Ingredients | Parts by weight |
|---|---|
| poly(1,4-butylene terephthalate) | 100 |
| poly(4,4'-isopropylidene diphenylene) phenyl phosphonate | 10 |
| % Phosphorus in composition | 0.8 |
| Combustibility | |
| Oxygen Index, % | 29.5 |

The high fire retardancy of this composition is shown by the Oxygen Index of 29.5%. This additive is highly effective with a total phosphorus content of only 0.8% in the composition.

The procedure is repeated, substituting the following aryl phosphonates for poly(4,4'-isopropylidene diphenylene)phenyl phosphonate:

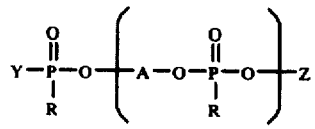

| R | A | Y | Z |
|---|---|---|---|
| 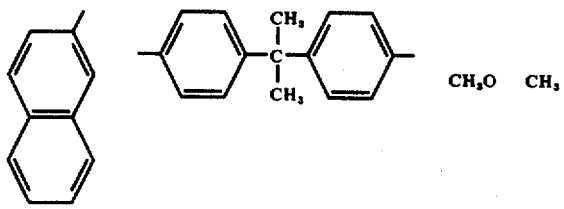 | | CH₃O | CH₃ |
| 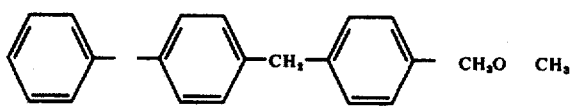 | | CH₃O | CH₃ |
| 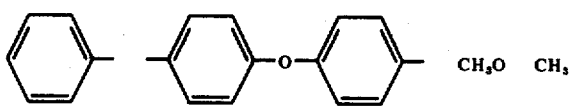 | | CH₃O | CH₃ |

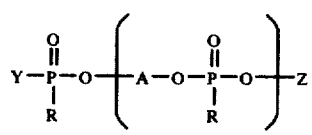

| R | A | Y | Z |
|---|---|---|---|
| 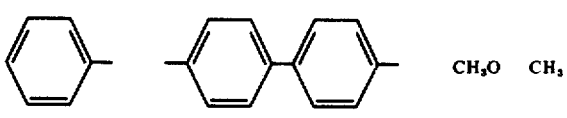 | | CH₃O | CH₃ |
| 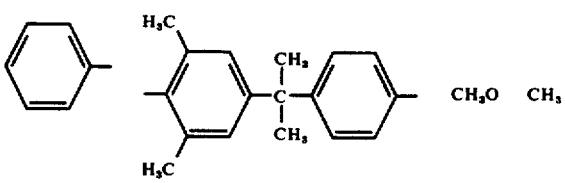 | | CH₃O | CH₃ |

Flame retardant compositions according to this invention are obtained.

EXAMPLE 7

The following formulation is prepared, melt-cast into bars and the Oxygen Index is determined:

| Ingredients | Parts by weight |
|---|---|
| poly(1,4-butylene terephthalate) | 100 |
| neopentylenephenyl phosphonate* | 10 |
| % Phosphorus in composition | 1.25 |
| Combustibility | |
| Oxygen index, % | 27.5 |

*Reaction product of neopentyl glycol and phenyl phosphonic dichloride.

The high flame retardancy of this composition is shown by the Oxygen Index of 27.5%. The intrinsic viscosity after processing is 0.66 dl./g., demonstrating that little or no degradation of the polyester has occurred.

EXAMPLE 8

The following formulation is prepared, melt-cast into bars and the Oxygen Index is determined:

| Ingredients | Parts by weight |
|---|---|
| poly(1,4-butylene terephthalate) | 100 |
| triphenylphosphine oxide | 10 |
| % Phosphorus in composition | 1.0 |
| Combustibility | |
| Oxygen index, % | 29 |

The very high degree of flame retardancy of this composition is demonstrated by its high Oxygen Index in this test.

EXAMPLE 9

The procedure of Examples 1–8 are repeated, substituting for the poly(1,4-butylene terephthalate), the following normally flammable high molecular weight linear polyesters:

a 70/30 ethylene terephthalate - ethylene isophthalate copolymer having an intrinsic viscosity of 0.674 (U.S. Pat. No. 3,047,539, Example 3);

poly(1,3-propylene terephthalate) prepared from trimethylene glycol and methyl terephthalate by the procedure of U.S. Pat. No. 2,465,319, Example 12; and poly(ethylene terephthalate).

Flame retardant polyester compositions according to this invention are obtained.

The procedures of the above examples are repeated, including in each formulation, respectively, 2.0 parts by weight of finely divided polytetrafluoroethylene resin, average particle size 0.3–0.7 mm. (DuPont Company, Teflon No. 6) and 1.25 parts by weight of fumed colloidal silica (Cab-O-Sil EH-5, Cabot Corp.) per 100 parts by weight of polyester and flame retardant additive. Compositions according to this invention, which do not drip while burning, are obtained.

Because of their excellent physical, mechanical, chemical, electrical and thermal properties and their enhanced flame resistance, the flame retardant polyester compositions of this invention have many and varied uses. The formulations may be used alone or mixed with other polymers and may contain various fillers, such as wood flour, diatomaceous earth, carbon black, glass fibers, etc., as well as pigments and dyes, stabilizers, plasticizers, and the like.

Obviously, other modifications and variations of the present invention are possible in the light of the above teachings. It is therefore, to be understood that changes may be made in the particular embodiments of the invention described which are within the full intended scope of the invention as defined by the appended claims.

I claim:

1. A flame retardant thermoplastic composition comprising:
   a. a normally flammable high-molecular weight poly(1,4-butylene terephthalate) resin and;
   b. as a flame retardant additive, the reaction product of neopentyl glycol and phenyl phosphonic dichloride, said reaction product being a single unit or being 2 to 50 repeating units of the formula;

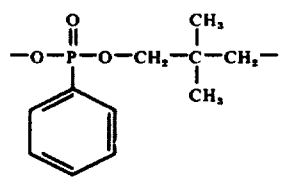

* * * * *